United States Patent Office 3,543,336
Patented Dec. 1, 1970

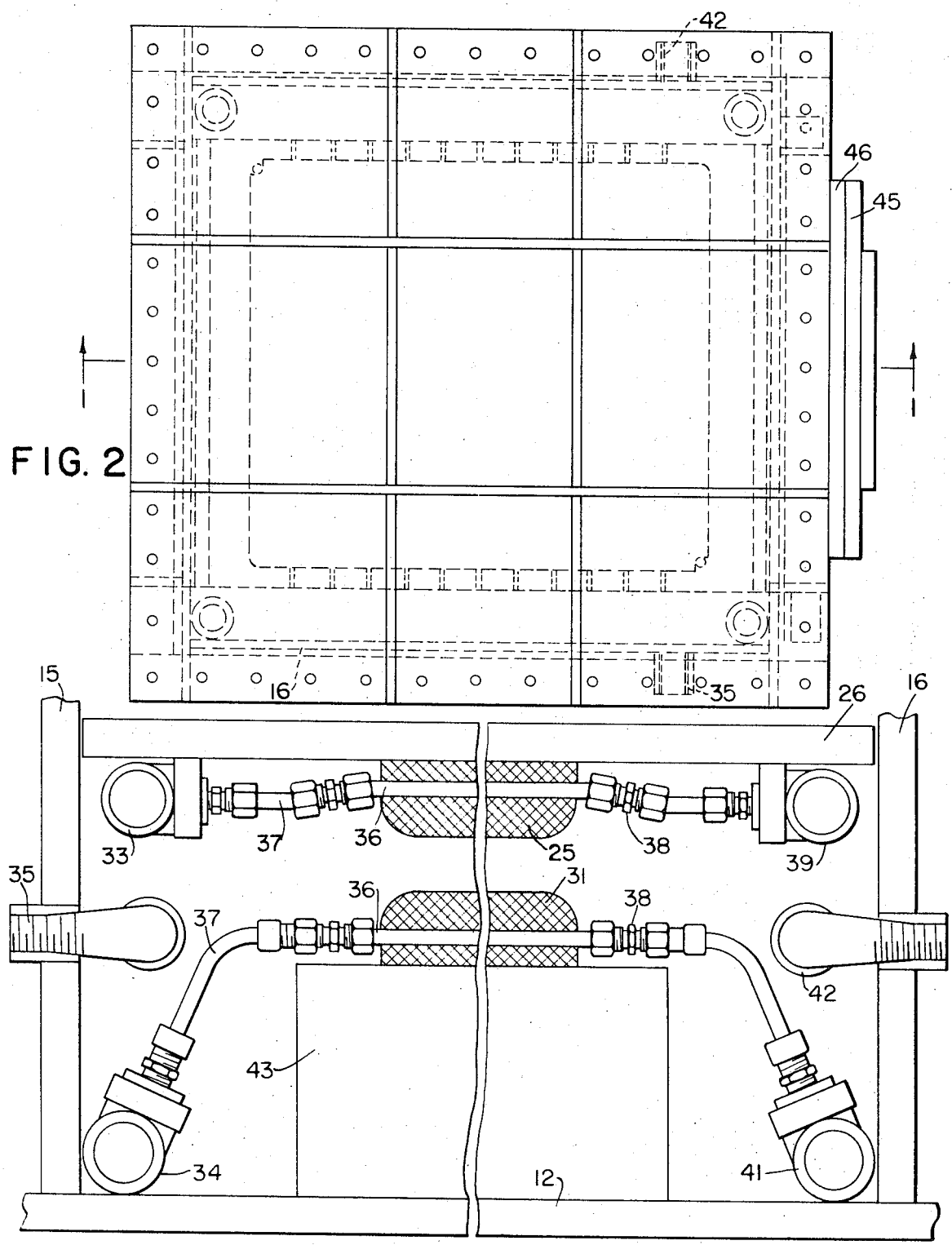

3,543,336
MOLDING APPARATUS
William J. Feeney, Brighton, Mass., assignor to W. R. Grace & Co., Cambridge, Mass., a corporation of Connecticut
Filed Mar. 25, 1968, Ser. No. 715,651
Int. Cl. B29h 5/00
U.S. Cl. 18—17                   3 Claims

ABSTRACT OF THE DISCLOSURE

A molding apparatus comprising an enclosure divided into pressure and vacuum chambers by a flexible diaphragm. Thermoplastic plates are molded between the water-cooled platens located in the vacuum chamber, which platens are also the electrodes of dielectric heating means. One platen is moved by the diaphragm. To mold, air pressure is applied above the diaphragm while air is removed from the lower vacuum chamber.

---

Figure 1:
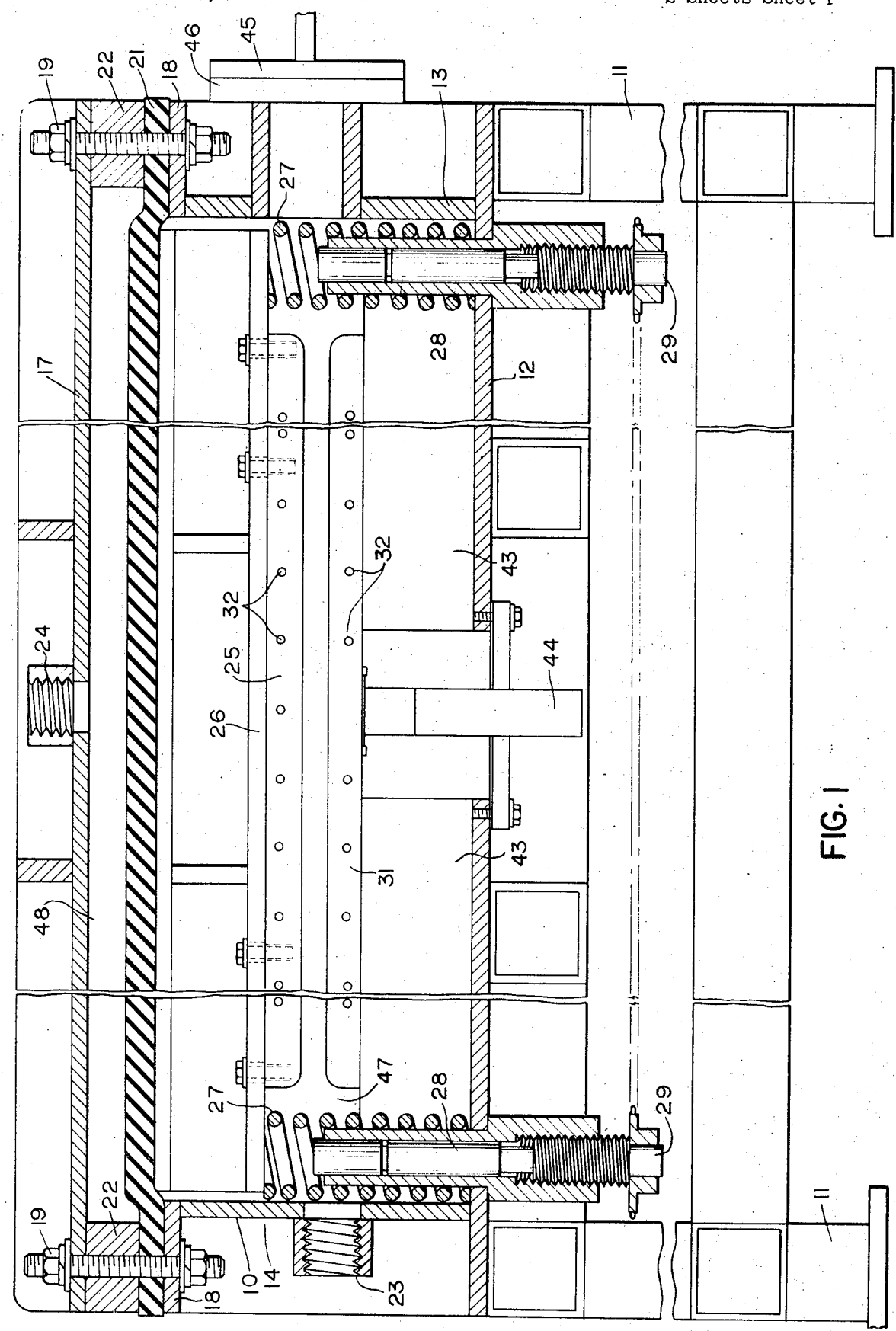

This invention is concerned with the molding of printing plates or other finely-detailed structures using a matrix material to impart an intaglio image thereto.

Duplicate letter-press printing plates made from moldable plastic substances can be either of two types: (a) flexible, where the plate itself is made of a somewhat resilient substance, notably rubber, and (b) when, as is usually required for flat-bed printing, the material of the plate is rigid.

Molding such plates between heated platens in conventional presses has in the past proved difficult.

If the plate material is thermoplastic, then, after molding, cooling to a temperature sufficiently low to rigidify the plate and allow it to be stripped from the matrix becomes necessary.

The very complicated problems of fill for each letter or for the illustrations demand that the resin to be molded should be at a completely uniform temperature and have a viscosity sufficiently low to flow into all printing areas with complete uniformity.

Since the result desired from a printing operation is the production of a uniform layer of image area color on the printed surface, the requirements for uniformity in the surface condition of the plate are extraordinarily exacting and cannot be met unless the operator used great care and judgment in the molding of each plate.

Additionally the output of a single molding press is relatively low because molding cannot take place until the plate material is uniformly heated, and cooled after molding.

Since many of the difficulties plaguing the production of flexible and rigid plates were caused by the fact that heat had to be transferred from the platens and the walls of the mold to the resin, a large number of difficulties disappeared when dielectric heating of the resin was substituted for conductive heat transfer. The temperature of the surrounding mold then became unimportant. In fact, the mold could be cooled continuously. The electro-magnetic energy absorbed by the resin could be precisely controlled with the result that the viscosity and temperature of the resin at the moment of molding could be regulated with exactness.

One difficulty remained. Closed letters, typically a's, o's, etc., often appeared in the plates as "broken type" since air trapped between the molding material and the mold prevented a full fill of the mold as the molding pressure was increased. But even this difficulty disappeared when the matrix was placed in an evacuated space and the platens were closed on the molten resin only after air had been removed from the enclosure.

Today the public is surrounded on every hand by examples of fine printing. The results which have been achieved, although based on a greatly improved technology, still depend in large measure upon the art of the plate maker and the skill of the pressman. Any development which places a less exacting demand upon these skills holds a high degree of economic significance.

Using the machine of the present invention, it is possible to retain all the advantages in plate molding which have been enumerated, but to avoid the weight, size, and relatively slow operation of molding presses, particularly hydraulic presses.

The machine described in the accompanying specification is, save for the necessary high-frequency electrical apparatus and air displacement means, completely self-contained. It need be but slightly larger than the printed page which it is intended to produce.

In the accompanying drawings:
FIG. 1 is a vertical cross-section on the line 1—1 of FIG. 2;
FIG. 2 is a plan view looking downwardly from the top of the apparatus;
FIG. 3 is a detailed front view showing the method view of cooling the platens of the apparatus.

In brief, the plate is molded in a vacuum chest between platens, one of which is insulated while the other is grounded and may be moved by a flexible diaphragm. Before molding pressure is applied to the resinous plate, air is removed from that area in the chest which holds the matrix and resin.

Specifically, the apparatus comprises a box 10 which can be hermetically sealed, mounted on an appropriate supporting structure including the legs 11—11.

Box 10 comprises bottom wall 12, front wall 13, back wall 14, side walls 15 and 16 and the top wall 17. Angular extensions 18, projecting outwardly at right angles to the front and back walls are drilled to receive a number of bolts 19—19 which passing through the flexible diaphragm 21 and spacer blocks 22 then pass through the top wall 17 and secure it, thus completing the air-tight structure.

Back-wall 14 is provided with a welded half-coupling 23 which connects to a conduit leading to a vacuum source (not shown). Top wall 17 is likewise provided with a centrally located half-coupling 24 which connects to a source of air pressure (not shown).

Platens 15 and 31 not only form the elements between which the molded material is compressed, but are also the electrodes of a high-frequency dielectric heating circuit in which platen, 31, is the high-potential element. Movable platen 25 is the grounded element.

The upper platen-electrode 25 is supported from a plate 26 which is held in elevated position by four, or more if necessary, compression springs 27—27. The position and alignment of springs 27 is maintained by fitting them over the spindles 28—28 which pass through the bottom wall 12. Consequently, air is admitted above diaphragm 21 and platen 25 is moved downwardly, compressing springs 27.

The extent of downward travel of platen 25 may be limited by adjusting the spacing screws 29—29 either up or down.

One or both of the platens can be cooled by water which flows through the passages 32 drilled in the body of the platen. Input water is fed to inlet marginal manifolds 33 and 34 through inlet 35 and through conduits 36 e.g. aluminum tubes in passages 32 by connections including tubes 37 which may be formed of suitable material, e.g. nylon or aluminum. Preferably, at least one of the tubes is of non-conductive material to prevent arcing when the apparatus is operated. The water is exited in essentially the same manner via connection 38 and exit manifolds 39 and 41 which are connected to outlet 42. Manifolds 33 and 39 are of course connected to inlet 35 and outlet 42, respectively, via a suitable flexible conduit, e.g., nylon, to permit movement of upper platen 26.

Platen 31 is mounted on a block 43 (or blocks) of insulating material which is also a feed-through insulator. The lead 44 connecting platen 31 with the high-frequency generator (not shown) passes through the insulator block 43.

Door 45 is formed in front wall 13 and is made large enough and positioned properly to allow a plate-making "sandwich" of matrix and sheet resin to be placed between the two electrodes. Compressible gasket 46 seals the door against the side wall whenever the door is closed.

The lower chamber 47 formed beneath the diaphragm where the plate is molded is connected via coupling 23 to external air-removing means. The machine is connected to a source of air pressure via coupling 24 and allows air pressure to enter chamber 48 formed above the diaphragm.

OPERATION

In molding printing plates from plastic materials, a matrix is usually prepared by molding a material, e.g. pulp impregnated with a thermosetting resin such as phenol-formaldehyde, against the type, line cuts, or halftones "locked up" in a compositor's chase.

Taking the manufacture of flexible plates as an example, the thermo-set matrix is overlaid with a sheet of the printing-plate material. This sandwich is pushed through the door-opening and placed between platens 25 an 31. Air is withdrawn from chamber 47 via coupling 23 and air pressure then admitted to chamber 48 via coupling 24 from a suitable source of air pressure (not shown).

Preferably the air pressure is applied in two distinct steps. Pressure in the first step is merely sufficient to lower the top platen into full contact with the sandwich and establish a good contact between the upper platen 25 and the sheet of resin which is to be molded. When sufficient air has been exhausted from the chest, the high-frequency circuit is switched on. As soon the the thermoplastic resin in the sandwich becomes sufficiently heated, the air pressure above diaphragm 21 is increased. The extent to which the sandwich is compressed is preferably controlled by bearers (not shown) inserted between the platens. Such bearers may be made of any suitable insulating material, e.g., a fiberglass composite. The high-frequency heating is stopped just before closing the platens to the bearers. Since the platens are continuously water-cooled via the water flowing through conduits 36 cooling begins immediately.

The machine can mold the average printing plate as used for labels, decoration of plastic sheeting, bottles, tubes, and book plates, very easily and quickly, usually in a minute or less. It can be conveniently placed on top of the R.F. cabinets of an inductive heating system.

Having thus described the invention, it is not intended that it be limited except as set forth in the following claims:

1. A printing-plate molding machine adapted for incorporation in the work circuit of high-frequency dielectric heating apparatus, comprising a chest having top, bottom, end, and side walls, a flexible diaphragm extending uninterruptedly across the chest and dividing the area within the chest into lower and upper chambers; a compressed air connection leading to said upper chamber, a vacuum connection leading to said lower chamber; two platens within the lower chamber having cooling water passages formed in each platen, means to connect the said passages to a cooling water supply, the said platens being oppositely faced and normally spaced apart, one of said platens being so mounted as to move in response to movements of said diaphragm, the other of said platens being rigidly mounted and electrically isolated from all other portions of the assembly; a door in the wall of said chest positioned to permit a plate-making sandwich to be inserted in and removed from the space between said platens; means to permit the air-tight closure of said door; and means to conduct high-frequency electrical energy to said fixed platen whereby molding material may be heated in the effective absence of air and molding pressure on said material may be exerted by compressed air admitted to said upper chamber.

2. Plate-molding apparatus according to claim 1, wherein means are provided to raise the said platen, including helical compression springs maintained in position by spindles extending through said bottom wall and fitted within the helices of said springs.

3. Plate-molding apparatus according to claim 2 having means to control the downward movement of said diaphragm comprising adjustable spacing screws adapted to move axially in bores formed in said spindle, each of said screws bearing sealing means to prevent air leakage along said bore.

References Cited
UNITED STATES PATENTS

| | | |
|---|---|---|
| 1,832,856 | 11/1931 | Brundage. |
| 2,148,704 | 2/1939 | Merritt. |
| 2,869,173 | 1/1959 | Van Hartesveldt et al. |
| 3,135,998 | 6/1964 | Fowler et al. |
| 3,371,380 | 3/1968 | Bruder et al. |

J. HOWARD FLINT, Jr., Primary Examiner

U.S. Cl. X.R.

18—16